Figure 1:
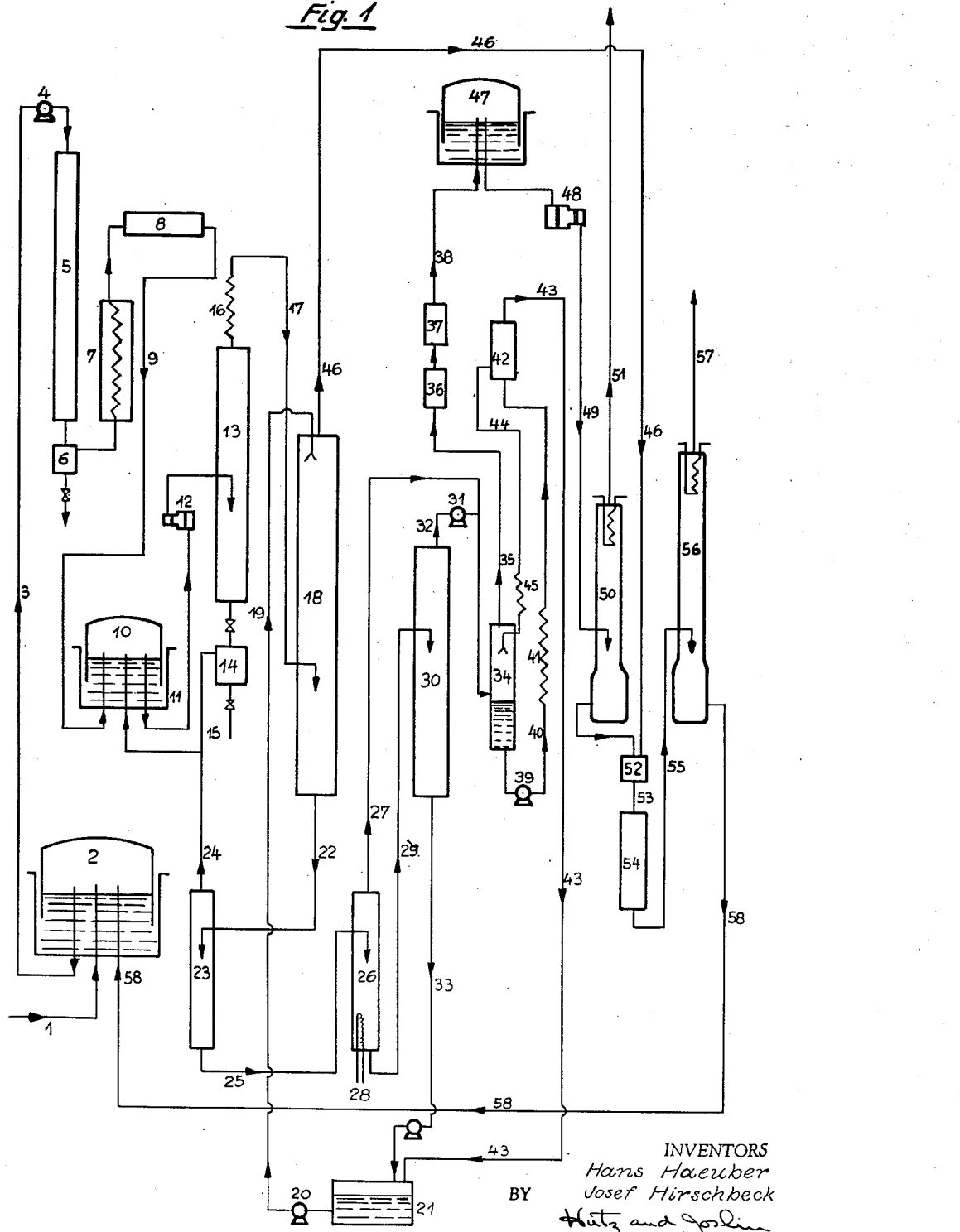

Patented Apr. 18, 1939

2,154,676

UNITED STATES PATENT OFFICE 2,154,676

PRODUCTION OF ETHYLENE FROM SATURATED HYDROCARBONS

Hans Haeuber and Josef Hirschbeck, Ludwigshafen-on-the-Rhine, Germany, assignors to I. G. Farbenindustrie Aktiengesellschaft, Frankfort-on-the-Main, Germany Application August 31, 1938, Serial No. 227,803
In Germany September 20, 1937

3 Claims. (Cl. 260—683)

The present invention relates to improvements in the production of ethylene from saturated hydrocarbons.

Ethylene can be obtained by dehydrogenation of ethane. In addition to other gaseous and liquid, saturated and unsaturated hydrocarbons, ethylene is also formed in the splitting of higher hydrocarbons, such as oils and oil residues, in particular gaseous ethane homologues. But also homologues of ethylene, such as propylene, butylene and the like, are formed by the said dehydrogenation so that there is only a comparatively small yield of ethylene calculated with reference to the initial materials.

We have now found that in the preparation of ethylene from saturated hydrocarbons having more than two carbon atoms, as for example from propane, the ethylene homologues formed from the initial materials, in particular the propylene, can be rendered useful again for the preparation of ethylene and at the same time an ethylene of a high degree of purity is obtained by first freeing the products of the thermal treatment of the said saturated hydrocarbons from acetylene and other compounds having triple carbon linkages, when such are present, then, after separating the products liquid at ordinary temperature—usually formed in small amounts in the treatment of gaseous homologues of ethane—separating the olefines with the aid of an ammoniacal cuprous salt solution and, after recovering the same from the latter, separating the ethylene therefrom by pressure distillation. The higher olefines (mainly propylene when using propane as the initial gas) are then led together with the gas not absorbed by the cuprous salt solution, which consists mainly of hydrogen, methane and homologues of methane, at elevated temperature, if desired under pressure, over hydrogenating catalysts, whereby the ethylene homologues are reconverted by the hydrogen into saturated hydrocarbons. The gas thus formed is supplied to the same or a separate thermal treatment after the separation of methane.

The removal of acetylene or other compounds having triple carbon linkages may be effected in any desired way. It is advantageous to work by converting these compounds into less unsaturated substances by hydrogenation. The conditions must be selected so that the olefines present in the gas are not converted. This may be effected for example by leading the gas coming from the splitting, without separating the liquid hydrocarbons thereby formed, at temperatures up to 300°, advantageously at from 180° to 200° C., over a catalyst consisting mainly of chromium oxide and nickel (for example according to the specification of the United States Patent No. 1,836,927). The gas thus treated is completely free from acetylene and other compounds having triple carbon linkages but still contains the original amount of olefinic hydrocarbons. The gas may then be separated by cooling or compression from the hydrocarbons contained therein which are liquid under ordinary conditions.

The removal of the olefines with the aid of cuprous salt solutions which then follows is advantageously carried out under increased pressure. It is preferable to work at pressures up to 50 atmospheres, advantageously between 10 and 25 atmospheres. Still higher pressures increase the absorptive power of the cuprous salt solutions only very slightly. Moreover there is then the danger that the higher homologues of methane present in the gas may liquefy and thus reduce the degree of purity of the olefines to be separated again from the cuprous salt solutions. The treatment of the gases with the cuprous salt solutions is preferably effected in counter-current in a vessel provided with filler bodies, advantageously in a washing tower. From about 96 to 98 per cent of the olefines present in the gas mixture are thus absorbed by the solution, while there escapes from the solution a gas consisting practically exclusively of hydrogen and saturated hydrocarbons which contains only small amounts of olefines.

The cuprous salt solution enriched in olefines is then released to atmospheric pressure, if desired in stages. If the pressure release be effected in stages, the small amount of gas mixture set free at first, for example by releasing the pressure to 2.5 atmospheres, is returned to treatment again with the cuprous salt solution. By further release of pressure to atmospheric pressure there escapes a gas containing more than 96 per cent of olefines. The solution is preferably also warmed somewhat, as for example to 35° C., and if necessary exposed to reduced pressure in order to expel the last traces of olefines. The lower the pressure in this case, the less need the solution be heated.

If desired the olefines expelled from the solution may be subjected to an aftertreatment with water in order to separate again the ammonia absorbed by the solution. The resulting aqueous ammonia may be heated and the ammonia supplied again to the cuprous salt solution.

The highly concentrated olefines thus obtained are then subjected to a distillation under pressure. In this way ethylene of a very high degree of purity is obtained. The higher olefines, in particular propylene, are led together with the gases not absorbed by the ammoniacal cuprous salt solution over a hydrogenation catalyst at elevated temperature, preferably between 100° and 300° C. It is of advantage to work under increased pressure, preferably under a pressure only slightly below the working pressure of the gas washing with the cuprous salt solution and the pressure prevailing during the distillation of the olefines, because in this way the favorable effect of increased pressure for the hydrogenation may be utilized without fresh compression, it is merely necessary, when the liquid products are to be hydrogenated at the same time, to bring the said liquid products to increased pressure, for which purpose no larger consumption of energy is necessary. As catalysts there may be mentioned all substances known as hydrogenation catalysts, as for example metals of the 6th to the 8th groups of the periodic system or their compounds, such as nickel on a carrier. By this treatment the homologues of ethylene are reconverted into saturated hydrocarbons. It is not necessary to add hydrogen because the gases not absorbed by the cuprous salt solution contain sufficient hydrogen.

If the homologues of ethylene obtained by the pressure distillation contain, in addition to propylene, still higher olefines, these may either be supplied to the hydrogenation together with the propylene, or they may be separated from the propylene and only the propylene subjected to the hydrogenation.

From the gas formed by the hydrogenation, the homologues of methane are separated in a suitable manner, as for example by a washing with hydrocarbon oils of high boiling point, and again supplied to the thermal splitting together with fresh initial gas.

By this process it is possible to obtain from saturated hydrocarbons having more than 2 carbon atoms very good yields of a very pure ethylene. When starting from gaseous homologues of ethane, in particular propane, there are obtained as by-products only small amounts of liquid hydrocarbons and a gas very rich in methane which is directly suitable for example for conversion into acetylene in the electric arc. Ethylene of a very high degree of purity can also be obtained in very good yields in a corresponding manner from liquid saturated (paraffinic and/or naphthenic) hydrocarbons. For this purpose the said liquid hydrocarbons are subjected to thermal splitting at high temperatures (generally speaking above 700° and preferably between 750° and 800° C.), the liquid fraction and any compounds having triple carbon linkages (such as acetylene) are then separated from the gas, the olefines are extracted from the gas with the aid of an ammoniacal cuprous salt solution, the olefines are recovered from the solution and the ethylene separated therefrom by distillation under pressure, the higher olefines are led together with the gas not absorbed by the cuprous salt solution and consisting mainly of hydrogen and methane hydrocarbons, if desired together with the said liquid fraction, at elevated temperature and preferably under pressure over hydrogenation catalysts whereby the ethylene homologues are reconverted into saturated hydrocarbons by the hydrogen, and then the resulting products, after separating the methane and the residual hydrogen, are again subjected to the splitting.

Plant suitable for carrying out the process according to this invention is shown diagrammatically in the accompanying drawings, but the invention is not restricted to the particular plant shown.

Referring to Figure 1, the plant is especially suitable for the treatment of gaseous homologues of ethane. The gas to be worked up, consisting for example mainly of propane, passes through a pipe 1, a gas-holder 2, a pipe 3 and a pump 4 into the splitting plant 5. Small amounts of reaction products of high boiling point are removed from the gas in a separator 6 and the gas then flows through a cooler 7 and an acetylene removal plant 8 through a pipe 9 into a gas-holder 10. The split gas free from acetylene is supplied from the gas-holder 10 through a pipe 11 to a compressor 12 in which it is compressed for example to from 25 to 30 atmospheres. In the vessel 13 there occurs the separation of any reaction products liquid at ordinary temperature which are still present in the gas, these products being released to atmospheric pressure in a separator 14. The gases thus set free are supplied to the gas-holder 10 through a pipe 15. The gases from the separator 13 pass through a cooler 16 and a pipe 17 into a washing tower 18 in which they are treated at about 20 atmospheres with an ammoniacal cuprous salt solution which is supplied from a reservoir 21 through a pump 20 and a pipe 19. The cuprous salt solution enriched with olefines passes through a pipe 22 into a trickling tower 23 where it is released to a lower pressure, as for example from 3 to 4 atmospheres. The gases thus set free are led again to the gas-holder 10 through a pipe 24 or may be treated in a second washing tower with ammoniacal cuprous salt solution. In the latter case there are obtained small amounts of a residual gas containing practically only saturated hydrocarbons which can be supplied to the gas-holder 2, while the cuprous salt solution containing the olefines in high concentration is further worked up together with the solution flowing from the trickling tower 23.

The solution leaving the trickling tower 23 through a pipe 25 is released to atmospheric pressure or slightly thereover in a trickling tower 26 heated by a heating coil 28. A gas rich in olefines is thus set free which escapes through a pipe 27. The cuprous salt solution passes through a pipe 29 into a vessel 30 in which by means of a vacuum pump 31 the olefines still contained in the solution are disengaged and united through a pipe 32 with the olefines escaping from the trickling tower 26. The cuprous salt solution freed from olefines passes through a pipe 33 back into the reservoir 21.

The olefines expelled from the cuprous salt solution are washed with water in a tower 34. They then escape through a pipe 35 and are freed from the last traces of ammonia and carbon dioxide with dilute sulphuric acid and dilute caustic soda solution in vessels 36 and 37. The highly concentrated gas then passes through a pipe 38 into a gas-holder 47. The washing water from the vessel 34 passes through a pump 39, a pipe 40 and a heater 41 into a vessel 42 wherein the dissolved ammonia is set free by heating and returned through a pipe 43 to the reservoir 21 for the cuprous salt solution. The remaining water passes through a pipe 44 and a cooler 45 back into the trickling tower 34.

The olefines from the gas-holder 47 are compressed by a compressor 48, for example to 25 atmospheres, and pass through a pipe 49 into a distillation plant 50. Ethylene in a high state of purity is withdrawn in a liquid or gaseous form through a pipe 51. From the lower part of the distillation plant 50, the higher olefines, practically free from ethylene and consisting mainly of propylene, are withdrawn and intimately mixed in a mixing vessel 52 with the gas containing mainly hydrogen, methane and unconverted propane escaping from the washing tower 18 through a pipe 46. The mixture is supplied through a pipe 53 to a hydrogenation plant 54 and passes thence through a pipe 55 into a distillation plant 56. Highly concentrated methane escapes therefrom through a pipe 57, while the higher homologues of methane, mainly propane, are supplied through a pipe 58 to the gasholder 2.

The gases leaving the hydrogenation plant 54 may also be subjected to an oil washing whereby a separation of the higher saturated hydrocarbons from methane is also effected.

The propylene fraction withdrawn at the bottom of the distillation plant 50 may if desired be freed in a further separating plant from the higher olefines contained therein in small amounts, so that mainly propylene alone is supplied to the mixing vessel 52.

Figure 2:
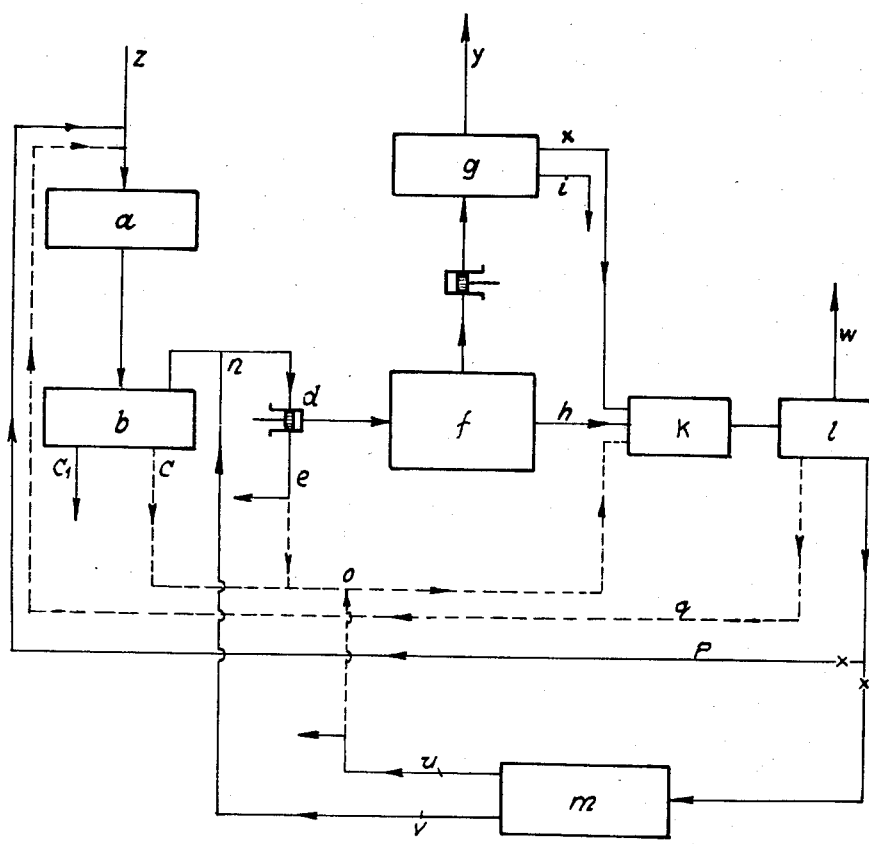

Referring to Figure 2, the plant shown diagrammatically is suitable for the preparation of ethylene from liquid saturated hydrocarbons.

The liquid initial materials are supplied at $z$ and are split in the plant $a$ in known manner, for example by vapor phase cracking. The liquid portion contained in the split product is preferably separated by cooling in $b$. This portion may also be separated fractionally and then removed separately (for example at $c$ and $c_1$). Very pure ethylene is obtained from the gaseous portion, if desired after removal of any hydrocarbons having triple carbon linkages, if such are present, by washing the gases with ammoniacal cuprous salt solution in $f$, expelling the dissolved olefines and distilling the same under pressure in $g$ as described in greater detail above in the treatment of gaseous initial materials. The ethylene is withdrawn at $y$. In addition to ethylene, there is obtained a concentrated mixture of gaseous homologues of ethylene which are led away through a pipe $x$, and separately therefrom a gas mixture consisting practically exclusively of hydrogen and saturated hydrocarbons which leaves the vessel $f$ through a pipe $h$. The treatment of the gaseous split product with ammoniacal cuprous salt solution in this case also is preferably effected at increased pressure, as for example at 20 atmospheres. By the compression of the split gas in $d$ thus necessary, small amounts of hydrocarbons liquid under ordinary conditions which are still present in the gas mixture are separated and these are supplied through a pipe $e$ to the liquid split products or may be used in other ways.

The homologues of ethylene which are obtained in the pressure distillation of the olefines recovered from the cuprous salt solution may be split up into further fractions if the separation of certain hydrocarbons or their fractions is desired. In this case, for example, higher olefines may be withdrawn through a pipe $i$. Generally speaking, however, the entire mixture is led over a hydrogenation catalyst in vessel $k$ together with the gas containing hydrogen not absorbed by the cuprous salt solution and if desired also together with the liquid products obtained by the splitting.

The inert gases and the methane are separated in $l$ from the hydrogenation product under the pressure prevailing during the hydrogenation or at a slightly lower pressure; they escape through a pipe $w$.

After the separation of the inert gases and methane following the hydrogenation, the gaseous methane homologues or fractions of the same may be split or dehydrogenated in $m$ with or without catalysts, if desired in the absence of oxygen. The gaseous products thus obtained are withdrawn through a pipe $v$ and mixed at $n$ with the gases obtained by the splitting of the initial materials; the liquid portions formed in small amounts which are rich in aromatic hydrocarbons are withdrawn through a pipe $u$ and may be united with liquid split products of the initial materials at $o$, hydrogenated together therewith and then led into the first splitting plant or supplied for other purposes.

It is preferable, however, to split only a part of the gaseous methane homologues separated after the hydrogenation and to add the remainder to the liquid initial materials through a pipe $p$. The returned gas can thus serve as carrier gas for the liquid initial materials and also serve as an initial material itself.

The methane homologues may also be wholly returned to the first splitting plant. When the liquid portion from the first splitting is led wholly or partly to hydrogenation in $k$, the liquid hydrogenation products may be led together with the gaseous products through a pipe $q$ back into the splitting plant $a$.

Depending on the nature of the initial materials to be worked up and of the desired products (whether only ethylene or also other gaseous olefines are to be obtained) one or other of the said modifications is chosen.

The substances capable of use for the process may be of greatly different kinds. As examples there may be mentioned petroleums, petroleum residues, liquid hydrocarbons obtained by chemical conversion of carbonaceous products, such as oils from the destructive hydrogenation, or from the interaction of carbon monoxide with hydrogen and the like. In many cases, for example in the treatment of products obtained by the interaction of carbon monoxide with hydrogen, it is preferable to subject the liquid hydrocarbons before the splitting to a hydrogenation treatment, as for example at from 180° to 200° C. and at atmospheric or increased pressure in the presence of hydrogenating catalysts.

From the liquid initial materials, ethylene can also be obtained in very high yields because the other reaction products of the splitting may also be worked up into ethylene by returning them after hydrogenation. The process may also be used for the removal of certain gaseous or liquid hydrocarbons or their fractions, such as propylene, normal and iso-butylene, benzene, in a simple manner when this is desired.

The following examples will further illustrate the nature of this invention but the invention is not restricted to these examples.

*Example 1*

1000 liters of propane gas are led per hour through a chromium steel tube (steel with about 30 per cent of chromium) 5 meters long and 20 millimeters in internal diameter which is externally heated by gases at from about 800° to 840° C. The gases and vapors formed are then led over a chromium oxide-nickel catalyst at from 180° to 200° C. The gas escaping therefrom is free from acetylene. The cracking gas thus purified is compressed to 30 atmospheres whereby in addition to 1770 liters of gas per hour, about 45 grams of liquid hydrocarbons boiling within the boiling point ranges of benzine are obtained. The composition of the propane gas and of the purified cracking gas is given in the following table:

|  | Propane gas—per cent by volume | Purified cracking gas—per cent by volume |
| --- | --- | --- |
| Hydrogen | | About 14.6. |
| Ethylene | | About 26.0. |
| Propylene and higher olefines | About 1.20 | About 12.9. |
| Methane | | About 29.5. |
| Ethane | | About 3.0. |
| Propane and higher saturated hydrocarbons | About 98.80 | About 14.0. |

The gas is then treated with an ammoniacal cuprous salt solution at a pressure of from 20 to 25 atmospheres in a washing tower provided with filler bodies, whereby practically all the olefines contained in the gas are absorbed.

The cuprous salt solution laden with olefines is released from pressure in 2 trickling towers, first to 4 atmospheres and then to 1 atmosphere above atmospheric pressure. The gas containing saturated and unsaturated hydrocarbons set free by the first pressure release is again supplied to the compressor. In the second trickling tower, the cuprous salt solution is heated to from 20° to 25° ·C. at the same time, whereby the greater part of the olefines escapes. The remainder of the olefines is recovered from the cuprous salt solution under reduced pressure of from 50 to 100 millimeters (mercury gauge). In this way there is obtained, after removing the ammonia and carbon dioxide by means of dilute sulphuric acid and dilute caustic soda solution, about 717 liters of gas having an olefine content of more than 96 per cent by volume. By distillation of this gas at a pressure of from 20 to 25 atmospheres a distillate is obtained containing about 95.7 per cent by volume of ethylene and also only hydrogen and methane. In the distillation still there remains a mixture consisting of about 97.6 per cent by volume of unsaturated hydrocarbons with about 90 per cent by volume of propylene. This residue is mixed with the gas not dissolved by the ammoniacal cuprous salt solution, which contains about 23.5 per cent by volume of hydrogen, 48.7 per cent of methane and 27.8 per cent of methane homologues, and led at from 100° to 150° C. under a pressure of from 18 to 20 atmospheres over a nickel catalyst, whereby the olefines are converted into saturated hydrocarbons. The resulting mixture is split up into two fractions by distillation without releasing the pressure. The gaseous fraction contains about 92 per cent by volume of methane in addition to small amounts of hydrogen and methane homologues. The liquid fraction contains only methane homologues of which about 90 per cent by volume is propane. This fraction is returned to the cracking plant.

Example 2

2.5 kilograms of an oil boiling between 200° and 350° C. obtained by the catalytic conversion of carbon monoxide with hydrogen at elevated temperature and under pressure are led per hour at 150° C. and under a pressure of 180 atmospheres together with hydrogen over nickel applied to alumina. The oil thus treated is free from oxygen-containing and unsaturated compounds. 2.1 kilograms of this oil per hour together with about 100 liters of a propane gas obtained by the hydrogenation of propylene are led through an electrically heated chromium steel tube (chomium content about 30 per cent) which is filled with balls of the same chromium steel. The temperature between the tube and the heating jacket is from 770° to 800° C. In this way there are obtained about 460 grams of an oil containing about 10 per cent of benzene and about 1790 liters of a gas of the following composition:

Per cent by volume
Ethylene _____ 24.0
Propylene, butylene_____ 12.5
Hydrogen_____ 15.2
Methane homolgues (ethane) _____ 4.0
Methane_____ 44.3

This gas is treated, as above described, with ammoniacal cuprous salt solution at 22 atmospheres pressure whereby there are obtained on the one hand about 650 liters of a gas mixture consisting practically of ethylene and propylene (ethylene content about 64 per cent) and on the other hand about 1140 liters of a gas mixture mainly consisting of methane and hydrogen. By distilling the olefinic mixture at 18 atmospheres, a gas containing more than 95 per cent of ethylene is obtained, while the remaining portion, mainly containing propylene, is united with the gases containing methane and hydrogen obtained from the previous olefine separation. This gas mixture is led at 200° C. and 15 atmospheres over a nickel catalyst whereby the unsaturated compounds present are converted into saturated compounds. By using the pressure already present on the reaction mixture, the propane formed (about 240 liters per hour) is separated from the other part of the gas which mainly consists of methane. Of the propane gas, about 100 liters per hour are added to the hydrogenated initial oil as a carrier gas for the splitting. The remainder is split in a second chromium steel tube heated to 830° C. The gases thus obtained are worked up together with the gases from the oil splitting. There are thus obtained per hour about 600 liters of ethylene gas having an ethylene content of more than 95 per cent and 1100 liters of a waste gas containing about 90 per cent of methane. The oil obtained by the splitting is returned to the oil hydrogenation preceding the splitting after the benzene contained therein has been separated.

What we claim is:

1. A process for the production of ethylene from saturated hydrocarbons containing more than two carbon atoms in the molecule which comprises cracking such saturated hydrocarbons to form a substantial amount of ethylene, removing from the cracked product any compounds containing triple carbon linkages and also substances liquid under ordinary conditions of temperature and pressure, treating the remaining gases containing ethylene together with higher olefines with an ammoniacal cuprous salt solution, thereby separating the olefines from the said gases, expelling the olefines from the said solution and then separating them by distillation into ethylene and higher olefines, passing the said higher olefines together with the part of the gases not having been absorbed by the ammoniacal cuprous salt solution at an elevated temperature over a hydrogenating catalyst and subjecting the hydrogenated gas after removal of methane, if any is present, again to cracking to form a substantial amount of ethylene.

2. In the process as claimed in claim 1, cracking propane to form a substantial amount of ethylene.

3. In the process as claimed in claim 1, cracking a liquid product, obtained by the interaction of carbon monoxide with hydrogen, after having been subjected to a hydrogenation treatment.

HANS HAEUBER.
JOSEF HIRSCHBECK.